Sept. 18, 1934.  C. C. BENNETT  1,974,006
GAUGE ARM
Filed June 22, 1931  2 Sheets-Sheet 2
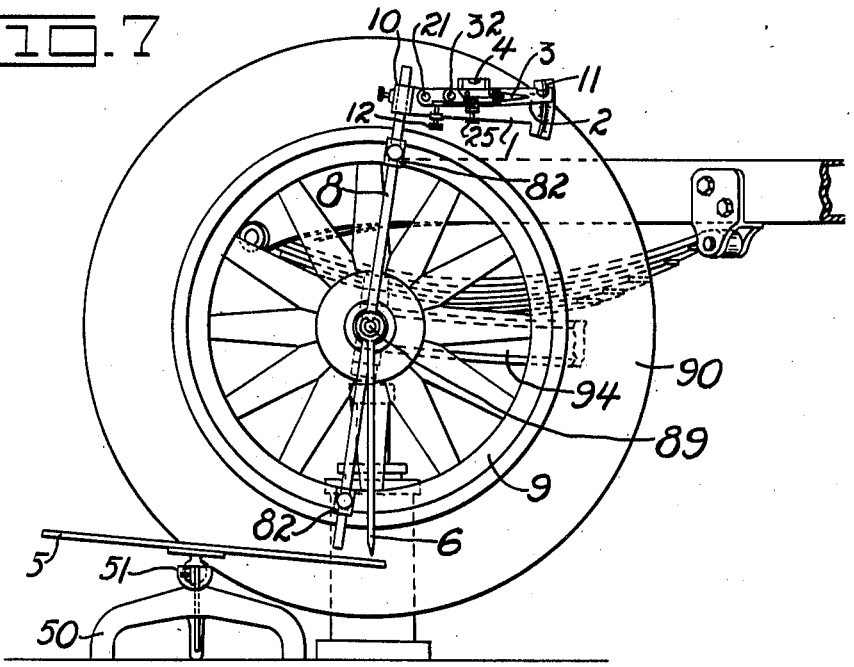
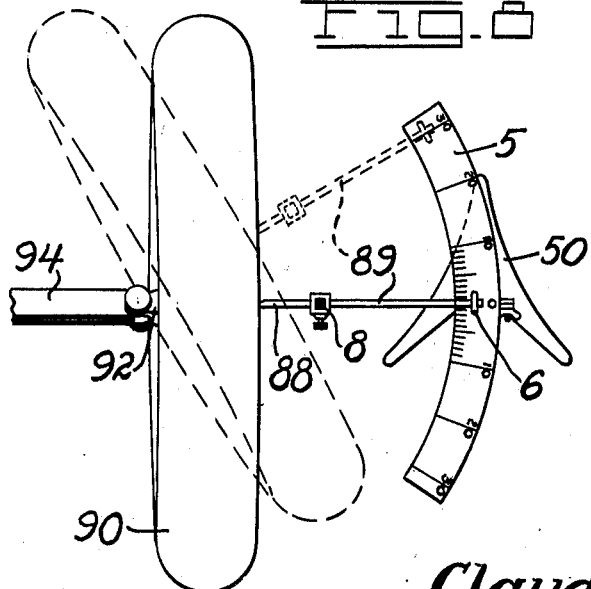
Inventor
Claude C. Bennett
By Charles L. Reynolds
Attorney Patented Sept. 18, 1934

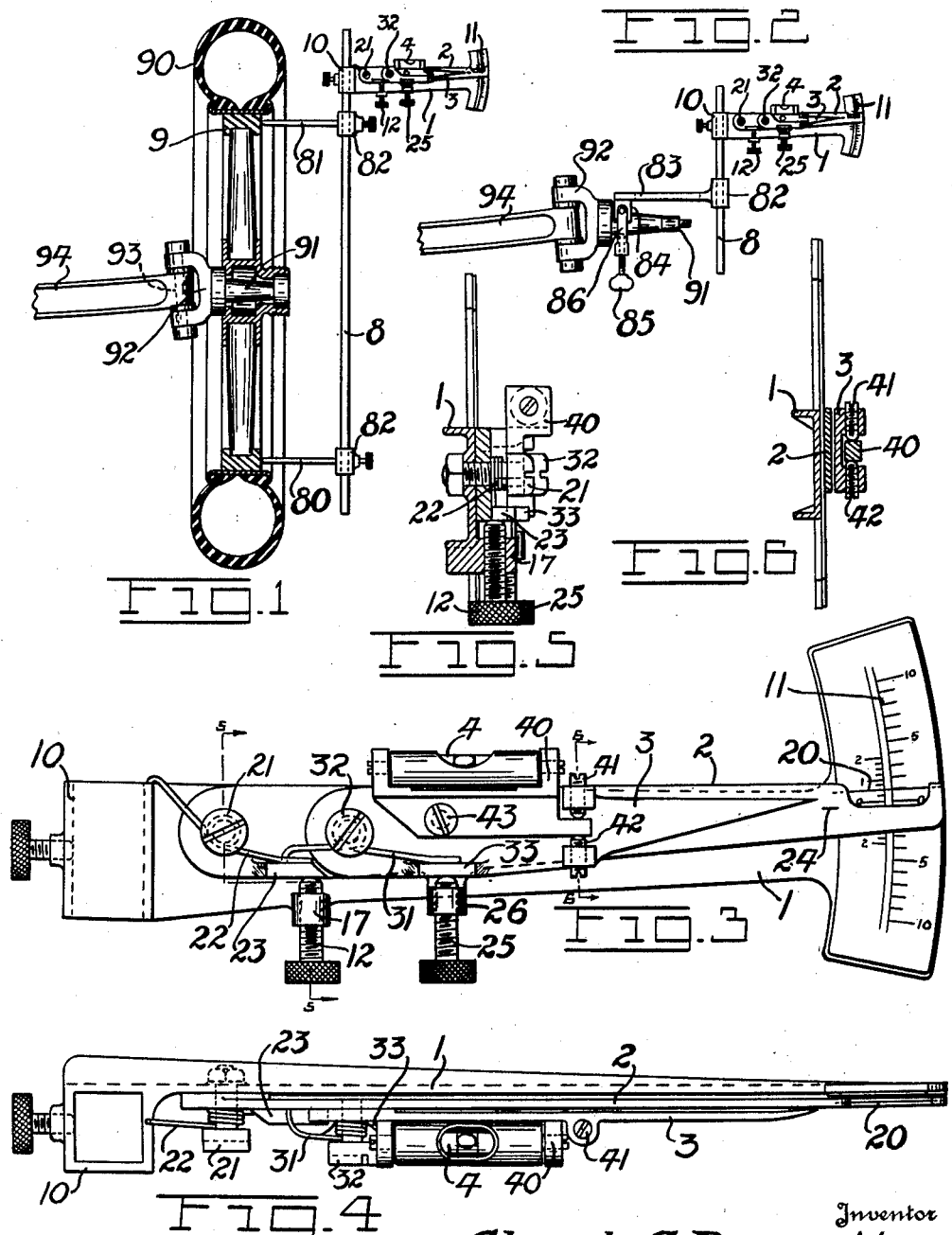

1,974,006

UNITED STATES PATENT OFFICE 1,974,006

GAUGE ARM

Claude C. Bennett, Seattle, Wash., assignor to A. E. Feragen, Inc., Seattle, Wash., a corporation of Washington Application June 22, 1931, Serial No. 546,084

10 Claims. (Cl. 33—203)

My invention relates to an improvement in gauges, particularly such gauges as are shown in my Patent No. 1,653,249, and in my applications Serial Nos. 296,269, filed July 30, 1928, and 297,686, filed August 6, 1928.

My present invention is particularly directed to an improvement in the gauge arm itself, and has for its primary object the provision of a gauge arm which may be used in conjunction with these gauges and others, which is a self-contained unit, and which enables the accomplishment of various different gauging operations, with convenience and an increase of speed over gauge arms heretofore employed.

A further object is the provision of a gauge arm and the gauge comprising the same, which shall be simple in construction and enable the accomplishment of additional gauging functions.

I have also discovered a method whereby the inclination laterally of the king pin may be read directly by means of such a gauge, and the same is herein disclosed and claimed.

My invention comprises the novel gauge arm and the novel gauge embodying the same, and also the novel method of determining king pin inclination, as shown in the accompanying drawings, described in this specification, and as will be more particularly pointed out and defined by the claims which terminate the same.

In the accompanying drawings I have shown my invention embodied in typical forms as now preferred by me.

Figure 1 is an elevation of my gauge complete, applied to an automobile wheel to determine camber or caster, the wheel and tire being shown in section.

Figure 2 is a similar view, showing my gauge applied to the spindle.

Figure 3 is a side elevation of the gauge arm itself, and Figure 4 is a plan view thereof.

Figure 5 is a transverse section on the line 5—5 of Figure 3, and Figure 6 is a similar section on the line 6—6 of Figure 3.

Figure 7 is a side elevation and Figure 8 a plan view of the gauge employed in determining the angle of king pin inclination according to my method.

Such a gauge is particularly designed for the measurement of small angles or small angular differences in connection with the alignment of the front wheels of an automobile. Such a wheel 9, with its tire 90, is shown in Figure 1. It is mounted upon the supporting spindle 91, and the spindle is so inclined with respect to the spindle body 92 that the wheel has a small amount of camber, that is, it is inclined outwardly at the top, perhaps as much as two degrees with relation to the bottom. The spindle body likewise is mounted upon a laterally inclined king pin 93, supported in the end of the axle 94. The king pin is inclined longitudinally of the car, as well as laterally. As seen in Figure 1 it is inclined with respect to the normal or straight-ahead plane of the wheel, so that a downward projection of its axis will substantially intersect the plane of the circle of contact of the tire 90 with the road at its instant point of contact. The axle 94 is also inclined slightly, so that the king pin 93 is inclined rearwardly as well, to bring the downward projection of its axis slightly ahead of the point of contact of the tire with the road. This is called caster. All of these angles are slight, yet must be precisely correct, and should be alike at both ends of the axle in order to prevent undue tire wear, faulty steering and the like. The present gauge and gauge arm are particularly designed to detect inaccuracies in these very small angles.

The contact members of the gauge will vary according to the vehicle member to which the gauge is to be applied. In Figure 1, a bar 8, square in cross-section, has mounted upon it gauge fingers 80 and 81, projecting from sleeves 82, which may be secured at any position in the length of the mounting bar 8. The gauge arm, which is part of the particular subject-matter of this application, and which is indicated at 1, is mounted upon the same mounting bar 8, being provided with a square sleeve 10 for this purpose. On the other hand, in Figure 2, the mounting bar 8 is received in a sleeve 82, which is upon the end of an arm 83, the arm having a V-block 84, adapted to fit upon a cylindrical portion of a spindle 91, and to be carried in a yoke 86 pivoted upon the V-block 84. The gauge arm 1 in this instance is secured upon the mounting bar 8 in the same manner as before, by means of the square sleeve 10, whereby the gauge arm 1 lies in the same plane as the arm 83 and the axis of the spindle 91. It is evident, then, that the gauge may be applied either to the wheel or to the spindle from which the wheel has been removed.

The gauge arm 1, as may be seen in Figure 5, has a scale marked off in angular measures at 11. Cooperating with this scale, or scale plate, is a gauge finger 2, pivoted at 21 upon the gauge arm 1, and having a hair line or wire 20, which cooperates with the scale 11. An adjusting screw 12, threaded in a lug 17 on the gauge arm 1, controls the angle of the gauge finger 2 relative to the scale 11, and a spring 22 holds the gauge arm down against the adjusting screw 12, the spring passing about the pivot bolt 21 and having its arms engaged respectively with the sleeve 10 and with a lug 23 upon the gauge finger 2.

A pointer 3 in turn is pivoted upon the gauge finger 2, at 32. Its point cooperates with an index mark 24, upon the gauge finger 2. A spring 31 holds the pointer 3 down against an adjusting screw 25, which is threaded in a lug 26 upon the gauge finger 2, and which bears against a lug 33 upon the pointer 3.

Carried upon the pointer 3 is a bubble tube 4. This bubble tube is carried in a yoke 40 which is pivoted at 43 upon the pointer 3. Set screws 41 and 42, threaded in lugs upon the pointer 3, serve to adjust the yoke 40 and the bubble tube 4 so that the bubble is level when the sleeve 10 is perpendicular, and when the pointer coincides with the index mark 24 and the hair line 20 coincides with the zero point of the scale 11.

It is known that caster inclination of the axle, that is, of the king pin, can be measured by applying such a gauge as is shown in Figure 1 or in Figure 2 to the wheel or to the spindle respectively, with the gauge arm projecting in the vertical plane of the spindle (the spindle being in straight ahead position, disregarding toe-in), and turning the wheel first forward a given amount, as thirty degrees, taking a reading, and then turning the wheel rearward the same amount and taking another reading, and subtracting the two. This may necessitate a subtraction of degrees plus and degrees minus a zero point, and in order to facilitate such an operation, and to read the angle directly, the present gauge arm may be used. The gauge is applied to the wheel in the usual way, and in the way shown in Figures 1 or 2. Now the wheel is turned forward through a thirty degree angle, and with the hairline 20 on the zero point of the scale 11, the pointer 3 is adjusted to bring the bubble tube 4 level. This throws the pointer off its zero index 24, the amount not being material in this operation. Now, the wheel is turned rearward thirty degrees, the gauge bar 8 being kept substantially vertical, and the end of the spindle moves through an arc which is inclined slightly downward to the rear, so that the angle of inclination increases. The gauge finger 2 is now adjusted, leaving the pointer as it was, until the bubble tube 4 is again level. The reading of the hair line 20 with respect to the scale 11 now gives direct the angle which is desired, which is the caster angle of the axle or of the king pin.

I have discovered that the lateral angle of inclination of the king pin can be ascertained by a somewhat similar method. The gauge arm 1 is applied at right angles to the position shown in Figures 1 and 2, or as seen in Figures 7 and 8; in other words, projecting either forwardly or rearwardly. Because the wheel has camber and the king pin is oppositely inclined to meet the plane of the wheel substantially at the point of contact with the roadway, the lower part of the wheel (where it contacts with the roadway) does not shift appreciably as the wheel pivots about the inclined king pin, but a point diametrically opposite this point through the end of the spindle does shift from somewhat behind the axis of the king pin to somewhat in front thereof, or the reverse. In other words, a wheel diameter, which is vertical when the wheel is in the straight-ahead position, changes angle from a forward inclination to a rearward inclination, or vice versa. This change of angle of the diameter from its inclination when the wheel or spindle is turned a given distance— 30°—forward to its inclination when turned the same amount rearward, is the angle of lateral inclination. Careful measurements show this to be true. The inclination angle may also be found by algebraically subtracting the angles measured on a 30° forward and a 30° rearward swing.

As a practical matter, it is convenient to think of the point of intersection of the king pin axis with the roadway—which is also approximately the point of contact of the wheel plane and the roadway—as the single point about which the end of the spindle swings. A point on the wheel diametrically opposite also swings forward and rearward, and is inclined likewise. In order to obtain a true indication of lateral king pin inclination, then, it is necessary that this condition be reproduced as the gauge is shifted with the wheel or spindle to which it is applied, and that it be not maintained upright, except when it is precisely in straight-ahead position.

Taking care that the wheel does not rotate relative to its spindle, the wheel is now turned to thirty degrees forward and then thirty degrees rear, the first adjustment being of the pointer 3 with respect to the gauge finger 2 and the next being of the gauge finger 2 with respect to the gauge arm 1, and the reading which is obtained on the scale 11 is the angle of lateral inclination of the king pin.

As has been stated, it is important that the wheel shall not appreciably rotate upon its spindle, and that the axis of the spindle move through precisely 30° each way from the straight-ahead position. The first end may be obtained by wedging the brake band to the brake drum, or by clamping a V-block, as 84, tightly to the spindle. The latter end may be attained by a suitable angle gauge and pointer, as seen in Figures 7 and 8.

In Figures 7 and 8 the angle gauge is shown as comprising a segment plate 5 supported upon a stand 50 which may rest upon the floor. Preferably the support is by means of a ball and socket joint, indicated at 51, so that the segment plate 5 may be rotated in a substantially horizontal plane and can be tilted both with respect to its length and in a direction longitudinally of the axle. It is only proposed, however, that this plate shall be used in conjunction with the pointer 6, which lies in or which is supported from a point which is within the extension of the spindle's axis. This may conveniently comprise a plumb bob 6 depending from a lateral rod 89, secured upon the mounting bar 8, and positioned to lie precisely in an extension of the spindle's axis. This may be accomplished by providing a centering pin 88, lying in inward extension of the rod 89, and adapted to center in the end of the spindle.

With the plumb bob 6 thus supported, it will swing over the segment plate 5, which is marked off in degrees, and the plumb bob may first be positioned in the plane of the axle, that is, with the wheel in straight-ahead position and the segment plate is then brought into position such that the plumb bob registers with its zero mark, as is shown in full lines in Figure 8. The wheel may then be turned to bring the plumb bob, or equivalent pointer, into registry with a thirty degree mark upon the segment plate in one direction, and then with the thirty degree mark in the opposite direction. It can be determined that the segment plate is set at the correct distance away from the wheel by observing whether or not the pointer supported from the wheel deviates as it swings from the circle of the segment plate. Now, with the gauge arm 1 applied in the manner indicated and as illustrated in Figure 7, the measurement of the lateral angle of inclination of the king pin may be carried out according to the method described above.

A gauge arm so constructed and a gauge employing this arm may be used in various operations of the general kinds described, which was only possible with the gauge in its earlier form through mathematical calculations which created the possibility of error through carelessness of the operator, or his lack of experience. The determination of the angle of lateral inclination, by the method disclosed may, however, be made with any suitable angular measuring gauge.

What I claim as my invention is:—

1. In combination with a gauge arm and means for supporting the same in definite relationship to a mounting, said gauge arm having an angular scale, an index finger pivoted upon said gauge arm to cooperate with said scale, a pointer pivotally mounted upon the finger, the finger having an index mark with which said pointer cooperates, a bubble tube carried by said pointer, the bubble tube, pointer and finger being so disposed relative to the arm-supporting means that when the pointer and finger are both at zero and the bubble tube is level, the supporting means are perpendicular.

2. The combination of claim 1, and means to adjust the angle of the bubble tube relative to the pointer.

3. The combination of claim 1, and screws to adjust the finger from the arm, and the pointer from the finger.

4. In combination with a gauge arm having a sleeve at one end at right angles to the arm adapted to receive a mounting bar, an index finger pivoted upon the arm near the sleeve, and extending laterally of the sleeve, the arm having an angular scale with which the finger cooperates, a pointer disposed substantially parallel to the finger and pivotally mounted upon the finger, the latter having an index mark with which the finger cooperates, a bubble tube pivotally mounted upon the pointer, and means to adjust the bubble tube relative to the pointer to bring the bubble tube level when the pointer and finger are at zero position and the sleeve is perpendicular.

5. A gauge comprising a mounting, means carried thereby for application to a reference surface, a gauge arm carried by said mounting, an index finger pivotally mounted upon said gauge arm, the latter having an angular scale with which the finger cooperates, a pointer pivotally mounted upon the finger, the finger having an index mark with which said pointer cooperates, and a bubble tube carried by said pointer.

6. The method of determining the angle of lateral inclination of the king pin of an automobile which consists in swinging the wheel or spindle which pivots about the king pin a given angular amount forward from the straight-ahead position, measuring the angular drop of the end of the spindle below a horizontal line through an initial straight-ahead position, swinging the wheel or spindle a like angular amount rearward from the straight-ahead position, measuring the angular drop of the end of the spindle, and adding the two angular drops to determine the angle of lateral inclination of the king pin.

7. The method of claim 6, the measurements of angular drop being made in each instance with reference to a diameter through the end of the spindle and substantially its point of intersection with the king pin axis, the wheel swinging about such latter point.

8. The method of determining the angle of lateral inclination of the king pin of an automobile which consists in disposing an angular gauge to swing with the wheel or spindle, and in a plane parallel to the plane of the wheel, and level when the wheel is in straight-ahead position, swinging the wheel or spindle and the gauge thirty degrees forward, ascertaining the angular change of the gauge as it tilts in one direction from its initial position, swinging the wheel or spindle and gauge thirty degrees rearward of the initial position, ascertaining the angular change of the gauge as it tilts in the opposite direction from the initial position, and algebraically subtracting the two angular changes to determine the angle of lateral inclination of the king pin.

9. The method of determining the angle of lateral inclination of the king pin of an automobile, which consists in swinging the wheel spindle which pivots about the king pin through a given angle from the straight-ahead position, in this assumed position establishing a reference line in a plane perpendicular to the spindle which is adapted to move with the spindle, ascertaining the relation of such reference line to a reference space direction such as a vertical or a horizontal line, swinging the spindle back through the straight-ahead position to a position the same given angular distance on the opposite side of the straight-ahead position, and ascertaining in this new position the angular change of the reference line relative to the reference space direction to determine the lateral inclination of the king pin.

10. The method of determining the angle of lateral inclination of the king pin of an automobile, which consists in swinging the wheel spindle which pivots about the king pin through an angle of 30 degrees from the straight-ahead position, in this assumed position establishing a reference line in a plane perpendicular to the spindle which is adapted to move with the spindle, ascertaining the relation of such reference line to a reference space direction such as a vertical or a horizontal line, swinging the spindle back through the straight-ahead position to a position 30 degrees on the opposite side of the straight-ahead position, and ascertaining directly in degrees the angular change of the reference line relative to the reference space direction, which angular change will be equal to the lateral inclination angle of the king pin.

CLAUDE C. BENNETT.